No. 776,025. PATENTED NOV. 29, 1904.
M. J. HILLMAN.
DOUBLE BOILER.
APPLICATION FILED JULY 8, 1904.
NO MODEL.
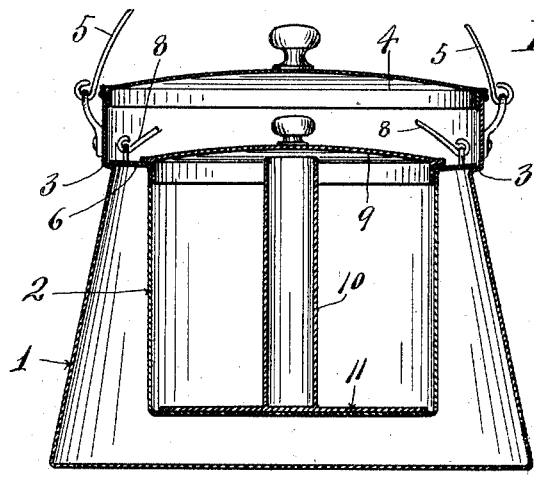
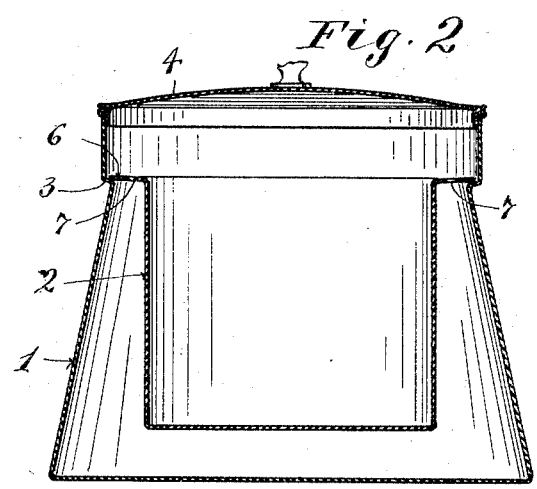
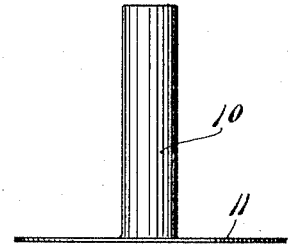
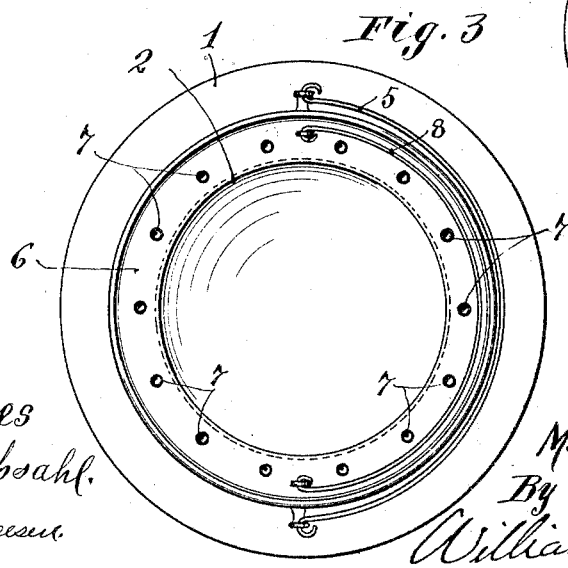
Witnesses
A. H. Opsahl
E. W. Jeppesen
Inventor.
M. J. Hillman
By her Attorneys.
Williamson & Merchant No. 776,025.

Patented November 29, 1904.

UNITED STATES PATENT OFFICE.

MARILLA J. HILLMAN, OF MINNEAPOLIS, MINNESOTA.

DOUBLE BOILER.

SPECIFICATION forming part of Letters Patent No. 776,025, dated November 29, 1904.

Application filed July 8, 1904. Serial No. 215,715. (No model.)

*To all whom it may concern:*

Be it known that I, MARILLA J. HILLMAN, a citizen of the United States, residing at Minneapolis, in the county of Hennepin and State of Minnesota, have invented certain new and useful Improvements in Double Boilers; and I do hereby declare the following to be a full, clear, and exact description of the invention, such as will enable others skilled in the art to which it appertains to make and use the same.

My invention relates to that class of cooking utensils generally designated as "double boilers," and has for its object to improve the same in the several particulars hereinafter noted.

To the above ends the invention consists of the novel devices and combinations of devices hereinafter described, and defined in the claim.

The invention is illustrated in the accompanying drawings, wherein like characters indicate like parts throughout the several views.

Figure 1 is a view in transverse vertical section, taken centrally through a boiler constructed in accordance with my invention, all the parts thereof being shown as placed in working position. Fig. 2 is a similar view to Fig. 1, but shows some of the parts removed, as is required in some classes of cooking. Fig. 3 is a plan view of the parts shown in Fig. 2, but with the cover of the outer kettle removed. Fig. 4 is a detail in elevation, showing a so-called "core-piece;" and Fig. 5 is a plan view of the same.

The numeral 1 indicates the outer pot of the cooking utensil. The numeral 2 indicates the inner pot thereof. The outer pot 1 preferably flares toward its base and near its top is formed with an annular shoulder 3, above which the said pot is formed cylindrical. A cover 4 fits into the cylindrical upper end of the pot 1, and the said pot is, as shown, provided with a bail 5, by means of which the device may be carried.

The inner pot 2 is much shorter and of much less diameter than the outer pot and is formed with an outturned flange 6 at its open upper end, which flange has a plurality of perforations 7 and at its marginal portion is adapted to rest upon the annular shoulder 3 of the outer pot 1 to support the said inner pot, as shown in Figs. 1 and 2. As shown, a bail 8 is hinged to the flange 6 to afford means for lifting the inner pot to and from operative positions. A detachable cover 9 fits with a quite close joint into the open upper end of the inner pot 2.

The numeral 10 indicates a cylindrical core which at its lower end is rigidly attached to the central portion of a disk-like plate 11. The core 10 is preferably open at its upper end and is approximately the same height as the inner pot 2. The disk or plate 11 is of such size that it loosely fits within the pot 2 and affords a false bottom therefor, as shown in Fig. 1.

Hitherto double boilers consisting of inner and outer pots have been provided in which the water contained within the outer pot and surrounding the inner pot was confined in a chamber having passages for the steam extending from the outer pot to the atmosphere, but not into the upper chamber of the inner pot. In practice I have found that with a boiler thus constructed in cooking the various ground meals, generally designated as "breakfast-foods," such foods would not be thoroughly cooked and would not be cooked so as to give the same the best possible flavor. With my improved boiler when the parts are adjusted as shown in Fig. 2 the steam rising from the water surrounding the inner pot and contained within the outer pot finds free escape upward through the perforations 7 of the supporting-flange 6 and from thence into the pot 2, where it commingles with the food which is being cooked, keeps the same moist, and greatly increases the rapidity and thoroughness of the cooking action.

In cooking brown bread, suet pudding, and some other breads or pastries the core 10 is placed in the pot 2, with the disk 11 resting on the bottom thereof, as shown in Fig. 1. Then when, as is usual, it is desirable to cook such bread or pastries comparatively dry the lid 9 is placed on the inner pot 2, as shown in Fig. 1. Sometimes, however, it is desirable to cook such bread or pastry moist, and in this case the cover 9 should be removed, so that the steam may come into direct contact with the material being cooked, as shown in Fig. 2, and, furthermore, will then enter the hollow metallic core 10 and will assist in cooking the interior or central portion of the said material which is being cooked.

The annular flange 6 serves to prevent water from boiling over into the interior of the inner pot 2, since it breaks up the bubbles of the boiling water; but its perforations nevertheless permit the free passage of the steam.

Stirring of the foods while cooking makes them sticky and pasty. With boilers as hitherto constructed stirring of the food has been necessary. With my improved boiler, however, no stirring is required, since the conjoint action of the hot water surrounding the inner pot and of the steam commingling with the contents thereof thoroughly cook the foods, as I have found, in about one-half the time required to cook the same in boilers as usually constructed.

The core 10 will project above the top of a baked brown bread or pudding, so that when the sides thereof are loosened from the kettle 2, which may be easily done by running a knife around the same, the said core may be used as a handle to lift the said loaf or pudding out of the kettle without danger of breaking the same. The said disk-like bottom plate or base 11, as is evident, prevents the loaf or pudding from sticking to the bottom of the kettle 2 and affords a support therefor.

All parts of the device are preferably constructed of metal. In some instances they will be galvanized, in some tin, and in others they will be constructed of what is known as "graniteware."

What I claim, and desire to secure by Letters Patent of the United States, is as follows:

In a double boiler, the combination with an inner kettle and an outer kettle, the former being supported from the latter by means permitting the passage of steam from the outer kettle into the inner kettle, a cover for the outer kettle, and a hollow core, open at its upper end and provided, at its lower end, with a disk-like base, adapted to fit within, and afford a false bottom for, said inner kettle, substantially as described.

In testimony whereof I affix my signature in presence of two witnesses.

MARILLA J. HILLMAN.

Witnesses:
  ROBERT C. MABEY,
  F. D. MERCHANT.